INVENTOR.
JOSEPH WOROBLE

United States Patent Office 3,452,277
Patented June 24, 1969

3,452,277
HIGH VOLTAGE TEST PROBE HAVING BALANCED TANDEM-MOUNTED SERIES-CONNECTED RESISTORS
Joseph Woroble, 55 Morgan Place,
North Arlington, N.J. 07032
Continuation-in-part of application Ser. No. 653,731, July 17, 1967. This application Apr. 26, 1968, Ser. No. 730,974
Int. Cl. G01r 1/06
U.S. Cl. 324—72.5                7 Claims

ABSTRACT OF THE DISCLOSURE

A hand-held probe for testing high voltages, such as those encountered in television sets, provides for a high resistance-carrying probe tube and a body (to which a probe tube is attached), and carrying within the body two matched and series-connected variable resistors of the commercial type, wherein their overall rating tolerance has been reduced by matching or balancing to values low enough to provide adequate accuracy for such use. A lower value adjustable minitrol resistor is also connected, in series between the two variable resistors and the minitrol is calibrated to provide even a lower overall rating tolerance for the aforesaid entire variable resistance series. The probe employs a neon lamp circuit designed to give a regularly blinking light when the dial is turned to reach the correct voltage to be measured. A high resistance voltage multiplier cartridge in the probe tube abuts against a conductive removable contact plate mounted in the body or at the inner end of the probe tube. A fixed resistance is provided between the neon lamp circuit and the last of the variable resistors, and a resistance-carrying jack may be inserted in the circuit between the fixed resistance and the last of the variable resistors for measuring RF and AC voltage ranges other than those set on the dial, as well as DC voltages. In the test probe for color TV (higher) voltage testing, the fixed resistance is inserted in the circuit between the last variable resistor and the neon lamp circuit, but the resistance-carrying jack for measuring other voltages, and the voltage multiplier high resistance cartridge are plugged or connected into the circuit between the fixed resistance and the neon lamp circuit. By this means, the voltage scale on the dial may be expanded to obtain more accurate voltage readings in any desired range.

Cross-references to related applications

This application is a continuation-in-part of copending application Ser. No. 653,731, filed on July 17, 1967, by Joseph Woroble.

Background of the invention

This invention deals with a hand-held probe for measuring high voltages. In the Woroble Patent 3,271,673, there is described a probe for measuring high voltages. It employs a single variable resistor which rotates with the dial. Commercial variable resistors, particularly in the 5 megohm range, are not very accurate, and they have a range tolerance of about plus or minus 20%, a value which makes voltage readings on the dial too inaccurate for such use. It is possible to make variable resistances with close tolerances, but such units are expensive.

At present, there is no convenient means for testing the plate voltage of the horizontal output tube in television sets. Yet, it is important for the service man to know this AC plate voltage in order to properly diagnose any trouble in the horizontal circuit. When conventional AC meters are employed, they burn out, so that present circuit directions with said sets instruct service men not to measure this voltage. The only means now employed is to draw an arc with a screwdriver and to roughly determine the length of the arc thus formed, which is a very crude way to measure the voltage.

Summary of the invention

According to the present invention, use is made of balanced tandem-mounted and series-connected smaller commercial variable resistors. For example, in the 2½ megohm range, commercial variable resistors have a range tolerance of about plus or minus 10%. Thus, it is possible to select a variable resistor having a range tolerance of plus 10% and to balance it with another commercial variable resistor having a tolerance of minus 10%, resulting in an assembly having a range tolerance of only about 2%, plus or minus. The resistances of each unit can be measured by means of a Wheatstone bridge, or by any other known means.

Also, according to the present invention, an adjustable minitrol resistor of lower value, say 1 megohm, is connected in series between the variable resistors, and the total resistance is calibrated, by adjusting the minitrol resistor, so that overall range tolerance can be reduced to less than 1%.

The balanced variable resistor series is connected at its end to a fixed resistance which reduces the voltage for the following connected blinker neon lamp circuit which latter connects with the first of the variable resistors in the series. A high resistance voltage multiplier cartridge is mounted in a cartridge tube attached to the body containing the rest of the circuit, and this probe-connected cartridge is inserted in the circuit between the last variable resistor and the fixed resistance. A jack connection also may be provided in the body between the last variable resistor and the fixed resistance to enable reading of various DC voltage ranges, depending upon the resistance present in the jack outlet. In the case of color TV voltage testing, the voltage is raised by inserting the fixed resistance between the first variable resistor and the neon lamp circuit, and the cartridge and jack are plugged into the circuit between this fixed resistance and the neon lamp circuit.

One important feature of the present probe is that it enables the reading of the plate voltage of the horizontal output tube in television sets with a good degree of accuracy.

Brief description of the drawings

The invention will be more readily understood by reference to the accompanying drawings in which a preferred embodiment is described, and in which.

The same numerals refer to similar parts in the various figures.

*Description of preferred embodiments*

Figure 1:
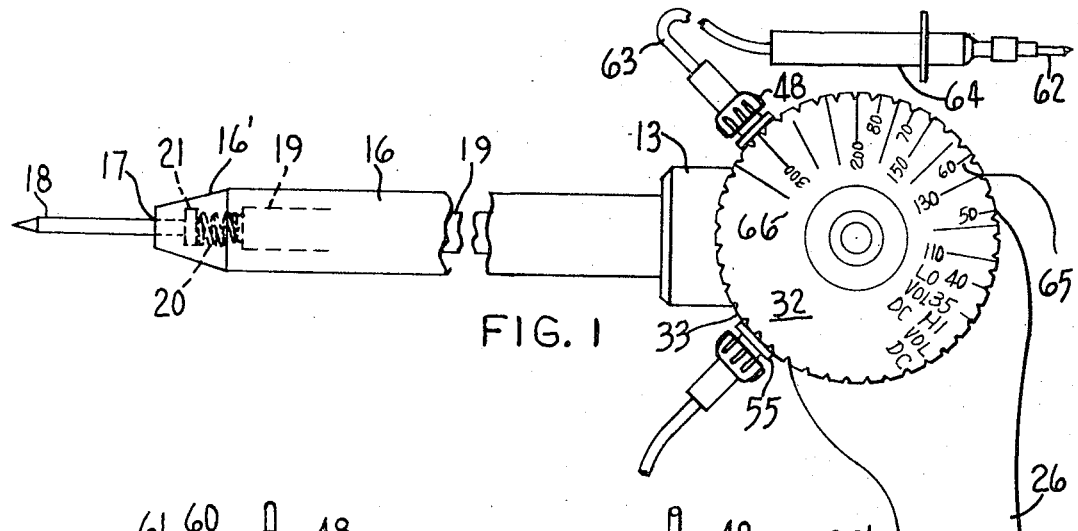
FIGURE 1 depicts a side elevational view of a test probe of the present invention, with a portion of the probe tube and resistor cartridge therein cut away.
Figure 3:
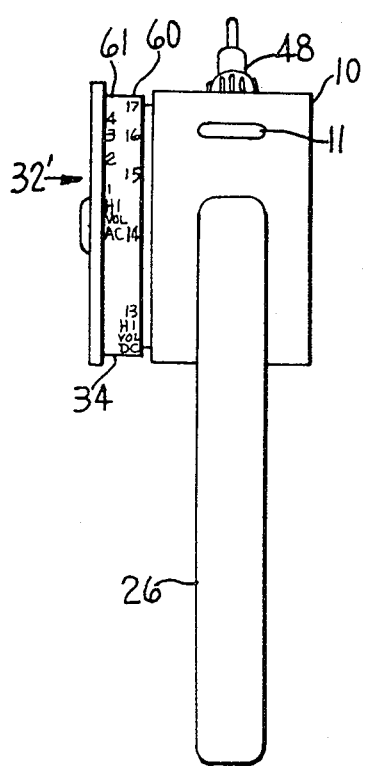
FIGURE 3 illustrates a rear elevational view thereof.
Figure 2:
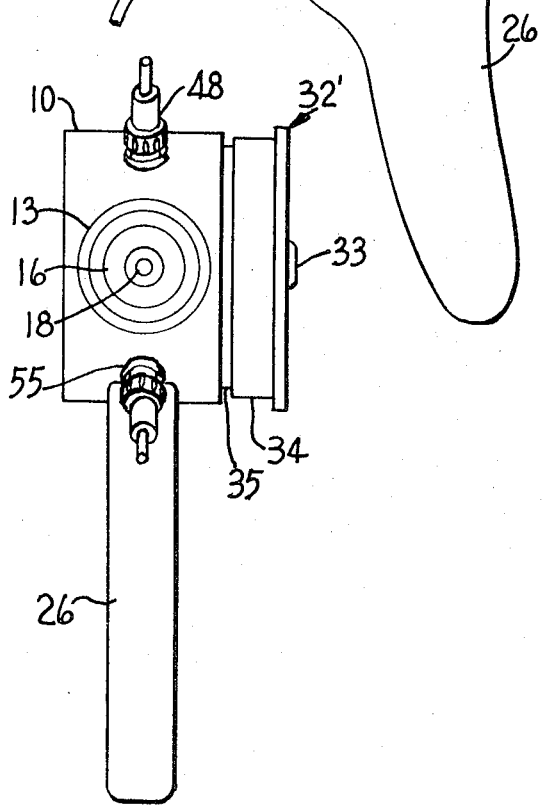
FIGURE 2 presents afront elevational view thereof.

Referring again to the drawings, numeral 10 indicates generally a hollow cylindrical body, preferably made of insulating plastic, and in which most of the electrical circuit is contained. An opening 11 serves as a window through which may be viewed the flashable neon lamp 12. A nipple 13 is attached to the curved side of body 10, said nipple having inner threads 14 for engaging threads 15 on the outside of the rearward end of probe 16, which also is made of insulating plastic. Probe tube 16 is tapered at the forward end 16', and is provided with an opening 17, through which a metal probe tip 18 projects. Probe tube 16 holds the high resistance cartridge 19, of about 500 megohms (say 495, for example), and one end of cartridge 19 abuts spring 20, the latter being disposed between cartridge 19 and head 21 of tip 18 (as in Patent No. 3,271,673).

The inner surface 10' of the curved portion of body 10 is provdied with notches 22 and 23 to enable insertion therein of conductive rigid plate 24 in a straddling position with respect to the inner opening in nipple 13. It is thus seen that, after the tip 18, spring 20 and cartridge 19 have been inserted in probe tube 16, the tube may be screwed into nipple 13 until contact 25 of cartridge 19 is in good electrical contact with plate 24. A pistol grip handle 26 may be attached to the curved outer portion of body 10.

Body 10 is provided with a flat face 27 having a central hole 28 through which protrudes shaft 29 of tandem-mounted variable control resistors 30 and 31. Rotatable dial 32' has dial plate 32 which is affixed tightly to the end of shaft 29, so that it will rotate the shaft as it is turned. The dial has a protruding ridged edge 33 for facilitating the turning operation. The dial also has a protruding sleeve 34 which fits against shoulder 35 of face 27. Bushing 36 of variable control resistor 31 is threaded to engage nut 37 so that the tandem-mounted variable resistors 30 and 31 are securely affixed to face 27.

One of the important features of the present invention is the use, in this particular instrument, of matched tandem-mounted variable resistors 30 and 31. If a single variable control resistor, of say 5 megohm rating, were used, its accuracy of plus or minus 20% (which is the best tolerance available on commercial resistor of this value) would make the voltage reading by the probe too inaccurate for use for this purpose. Lower value commercial variable resistors have lower rating tolerances. For example, a variable resistor having a 2½ megohm rating would have a rating tolerance of about plus or minus 10%. It is possible to measure or calibrate such resistances readily by means of a Wheatstone bridge, or by other known means.

According to the present invention, a multiple, say two lower value variable resistances, say of 2½ megohm value, are employed, rather than one large one. By measuring accurately and calibrating these resistances, it is possible to match a 2½ megohm variable control resistor having a plus 10% tolerance with a 2½ megohm variable control resistor having a minus 10% tolerance, so as to end up with a 5 megohm resistance having a tolerance of about plus or minus 2%. These resistances 30 and 31 are mounted in tandem on the same shaft 29, and they are connected in series.

Another feature of the present invention is the connection in series with the aforesaid two variable control resistors 30 and 31, of a lower value flat adjustable resistor 38, known as a minitrol resistor. This unit of, say 1 megohm value, is placed flat against variable control resistor 31, with a strip 61 of insulation therebetween. By measuring the resistance of all three resistors (30, 31 and 38), it is possible to adjust the resistance of minitrol resistor 38 by inserting a screwdriver in hole 39 (FIG. 4) and thus calibrate the entire series so that it would have a rating tolerance of less than plus or minus 2%, or plus or minus 1%, or even less, which is in the satisfactory accuracy range for this instrumentation. All of this may be done without increasing the cost of the probe excessively.

Figure 4:
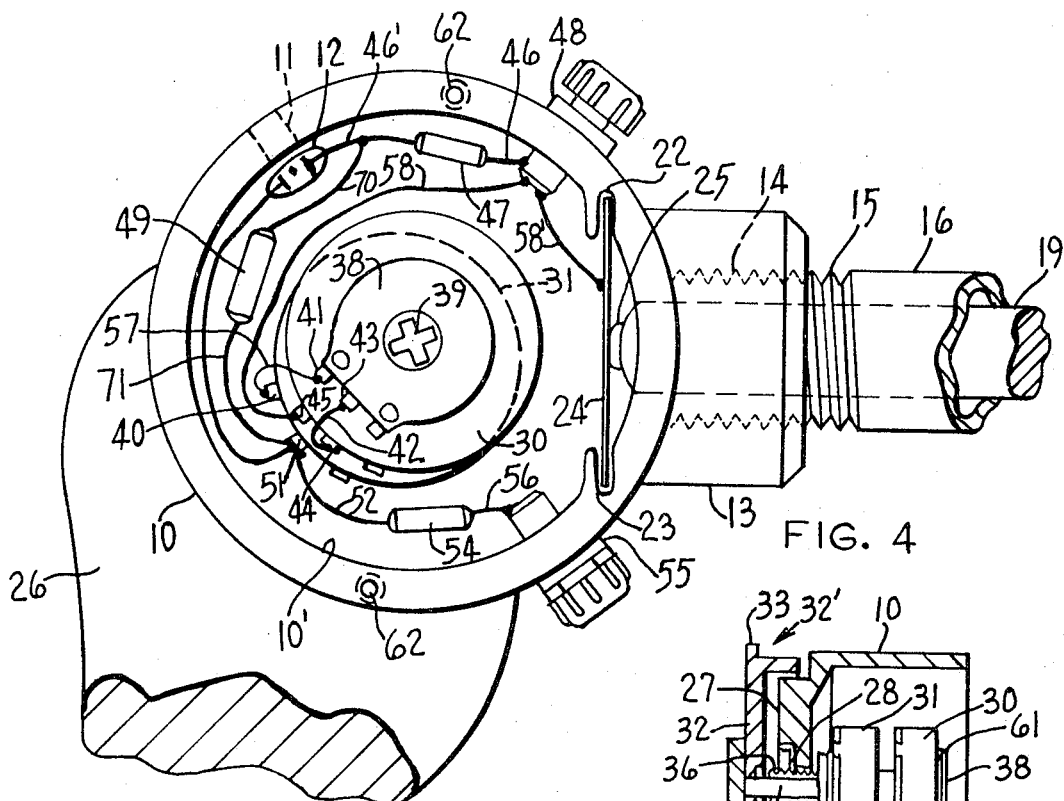
FIGURE 4 shows an enlarged side elevational view threeof with portions of the handle and probe tube and cartridge cut away, and with side cover plate removed.
Figure 5:
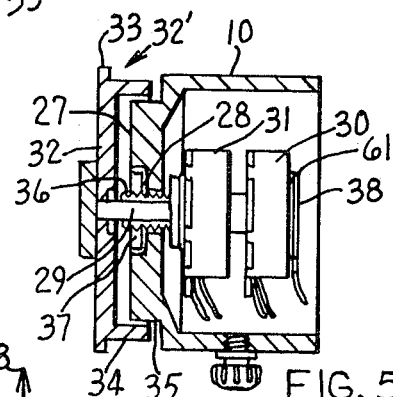
FIGURE 5 illustrates a vertical cross-sectional view of the rear portion of the body, showing the tandem arrangement of the variable resistors.
Figure 6:
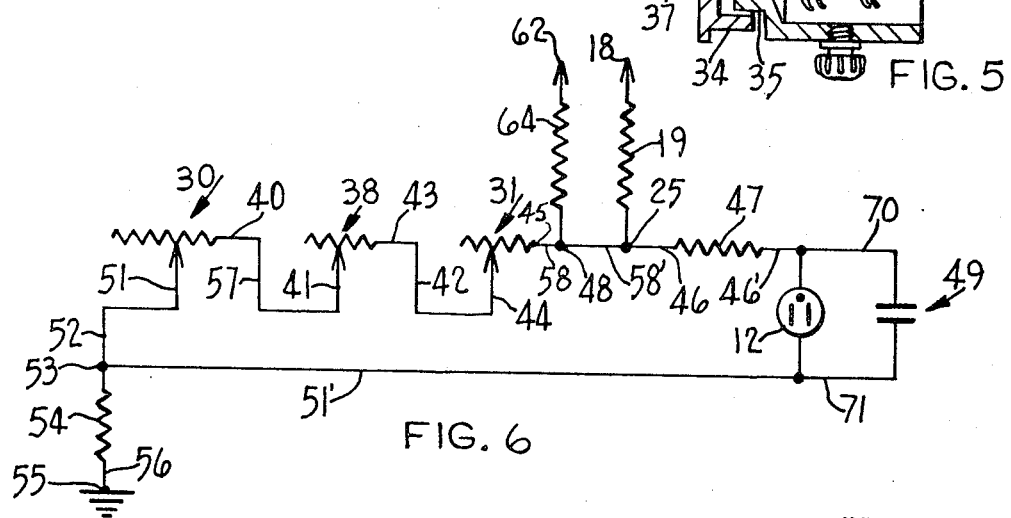
FIGURE 6 depicts the electrical circuit diagram of the same unit.

As can be seen from the circuit diagram displayed in FIG. 6, as well as the component layout in FIG. 4, variable control 2½ megohm resistor 31 has one stationary terminal 40 connected by line 57 with movable terminal 41 of 1 megohm minitrol resistor 38. The stationary terminal 43 of minitrol resistor 38, in turn, is connected by line 42 to movable terminal 44 of variable 2½ megohm resistor 30. The stationary terminal 45 of variable resistor 30 is then connected by line 58 with jack connection 48 which is used for testing AC or DC voltages. The latter is connected by line 58' to plate 24 (which is connected to contact 25 of resistor 19). These (as well as jack connection 48) are connected by line 46 to 330,000 ohm fixed resistor 47. The purpose of the latter is to adjust the speed of blinking of neon lamp 12 and thus permit easier reading of the dial when testing exceptionally high voltages, and to protect lamp 12 from burning out. Resistor 47 can have different resistance values to accommodate any desired voltage range to be measured. The other terminal of resistor 47 is connected by line 46' to lamp 12. A 0.02 mfd. condenser 49 is connected across lamp 12 by lines 70 and 71.

The movable terminal 51 of variable resistor 31 is connected by line 52 to terminal 53 of 1 megohm fixed resistor 54. The purpose of this resistor 54 is to provide a voltage differential in the neighborhood of 63 volts above ground 55. This is required, as otherwise lamp 12 could not be made to blink. The other terminal of resistor 54 is connected by line 56 to ground jack 55. A cover plate (not shown) is attached to body 10 (FIG. 4) at screw holes 62.

The dial, generally designated as 32', is provided with four scales. The first scale 60, on the inner rounded surface of sleeve 34, is designed to read DC high voltages, say 13,000 to 26,000 volts, when probe 18 is contacted with the voltage source. The second scale 61, outwardly disposed alongside scale 60, is designed to test AC high voltages. This testing is done with probe 62 having lead 63 connected to jack 48. In this case, a 15 megohm resistance 64 is connected between the probe 62 and jack 48.

The third scale 65 is disposed on the outer edge near rim 33 on dial face 32. This is for testing high voltage DC in the range of 350–800 volts. Probe 62 is employed for this purpose. The fourth scale 66 is disposed near the hub of dial face 32, and it is used to measure DC lower voltages in the range of 110–300 volts. In this case, another probe 62 is used, but the resistor 64 then should have a value of say 800,000 ohms.

When the voltage is measured, the proper probe is applied to the voltage source and dial 32 is turned with the thumb until the neon lamp 12 begins to blink regularly through window 11. Thereafter, the voltage is read on the proper scale by reading the value opposite index line 66.

Figure 7:
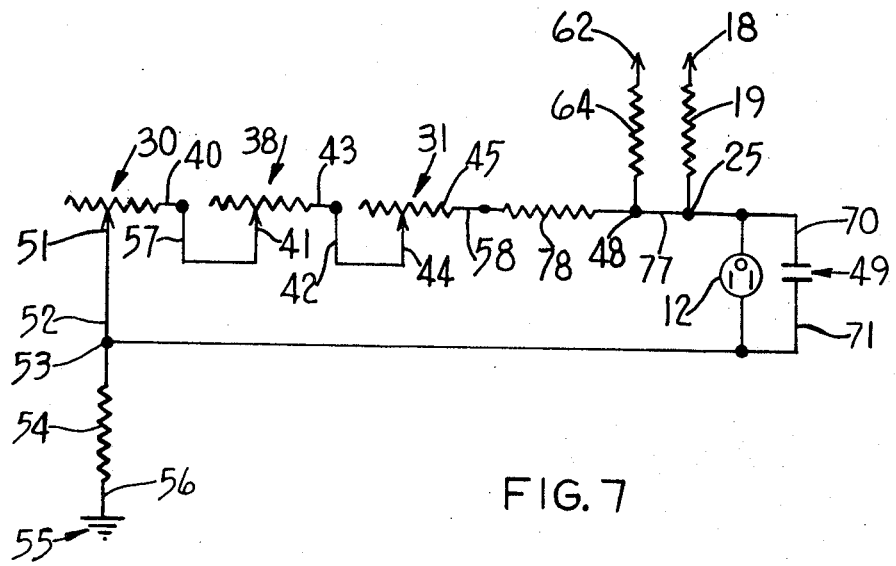
FIGURE 7 depicts an alternate electrical circuit diagram designed specifically for measuring high voltages of color TV sets.

In FIG. 7, there is depicted a modification of the electrical circuit shown in FIG. 6, and it is specifically designed for measurement of high voltages in color TV sets. In view of the recently developed importance of avoiding radiation leakage from such sets, it has become necessary to enable the more precise reading of voltages in the, say 20,000 to 30,000 volt range, or even higher. In this circuit, the two balanced variable resistors 30 and 31 may have a rating of, say, 750,000 ohms, and the minitrol resistor 38 would have a rating of, say, 100,000 to 200,000 ohms. In such case, the resistance cartridge 19 could have a value of, say, 900 megohms. The voltage multiplier resistance cartridge is raised in resistance value to increase the sensitivity and to reduce the loading on the circuit. In order to provide adequate voltage to light up neon lamp 12 and to expand the scale to enable reading of each thousand volts individually, a fixed resistance of, say, 1,820,000 ohms, is inserted between the neon lamp circuit and the last variable resistor 31. This arrangement necessitates the connection of the high resistance voltage multiplier cartridge 19, and the plugging in of the resistance-carrying jack 64 (at plug 48), between resistance 78 and neon lamp 12. Fixed resistance 78 serves as a calibrating resistance, the value of which may be varied, depending upon the voltage scale range to be measured and the dial calibration range on dial 32.

To expand the voltage scale even more, it would be necessary to lower the resistance values of all variable resistors, and to raise the value of fixed resistance 78, correspondingly. By this means, the scale 60 between, say 20,000 to 30,000 volts, is expanded to enable reading of each 1,000 volts, or even less, depending on the values of the variable and fixed resistances employed.

Figure 8:
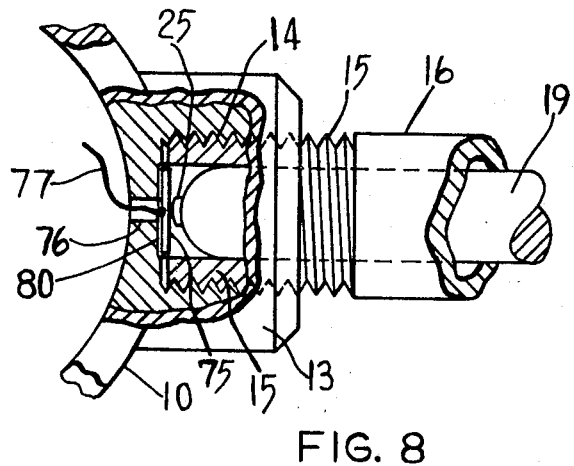
FIGURE 8 depicts an enlarged side elevational view portion of that shown in FIGURE 4, with body and probe tube portions cut away to illustrate an alternate resistance cartridge terminal connection.

FIG. 8 discloses a connecting method for cartridge 19 which differs from that shown in FIG. 4, in that the inner end of cartridge 19 does not project into the inside of body 10. A small opening 76 is provided in the body wall having an exterior flat shoulder 80, against which rests flat conductive plate 75. This serves as a connection for contact 25 of the cartridge. Soldered to the other side of plate 75 is lead 77 which joins the circuit, as in FIG. 7.

I claim:
1. A high voltage test probe of high accuracy, as described, comprising, in combination:
   a hollow body having two closed faces, a tubular extension, and a handle,
   a centrally disposed opening in one of said faces,
   a tandem- and common shaft-mounted pair of tolerance-balanced, series-connected variable resistors mounted in said latter body opening and having their common shaft projecting through said face opening,
   an adjustable minitrol resistor of smaller resistance value than either of the aforesaid variable resistors, connected in series between said variable resistors within said body,
   a fixed resistance and blinker neon lamp circuit connected in said body across the aforesaid three series-connected resistors,
   a high resistance cartridge and terminal probe mounted in said tubular extension of said body, and connected into said circuit between said neon lamp circuit and the last of said three series-connected resistors, and
   a resistor ground connection inserted in the circuit in said body between said neon lamp circuit and the first of said three series-connected resistors.

2. A high voltage test probe, according to claim 1, in which said cartridge is connected between said fixed resistance and the last of said three series-connected resistors.

3. A high voltage test probe, according to claim 2, in which a resistance-carrying probe jack is also insertable in the circuit between the last variable resistor and the fixed resistance.

4. A high voltage test probe, according to claim 1, in which said cartridge is disposed between said fixed resistance and said neon lamp circuit.

5. A high voltage test probe, according to claim 4, in which a resistance-carrying probe jack is also insertable in the circuit between said fixed resistance and said neon lamp circuit.

6. A high voltage test probe, according to claim 1, in which a conductive plate is inserted within said body and in straddling relation with respect to said tubular extension in a manner such that the inner terminal of said cartridge is in contact therewith, and said plate serving as a connecting terminal therefor.

7. A high voltage test probe, according to claim 1, in which a conductive plate is mounted across the inner opening of said tubular extension in direct contact on one side with the inner terminal of said cartridge, and the other side of said latter plate serving as terminal connecting means for said cartridge and the remainder of the circuit within said body.

References Cited

UNITED STATES PATENTS 2,779,919  1/1957  West _____ 324—72.5
3,271,673  9/1966  Woroble _____ 324—72.5

RUDOLPH V. ROLINEC, *Primary Examiner.*

E. L. STOLARUN, *Assistant Examiner.*

U.S. Cl. X.R.

324—149